United States Patent [19]
Mergenthaler

[11] 3,751,883
[45] Aug. 14, 1973

[54] APPARATUS FOR SCRUBBING OF GASEOUS FLUIDS

[75] Inventor: Helmut Mergenthaler, Jesingen/Teck, Germany

[73] Assignee: Otto Keller, Jesingen/Teck, Germany

[22] Filed: Jan. 19, 1970

[21] Appl. No.: 4,015

[30] Foreign Application Priority Data
Jan. 28, 1969 Germany.................. P 19 03 985.1

[52] U.S. Cl...................... 55/248, 55/256, 55/257, 261/118, 261/DIG. 54
[51] Int. Cl.................................................. B01f 3/04
[58] Field of Search................ 55/248, 249, 256, 55/257, 255; 261/DIG. 54, 115–119, 77, 121 R

[56] References Cited
UNITED STATES PATENTS
3,138,442  6/1964  Krantz .......................... 261/DIG. 54
3,138,441  6/1964  Krantz .......................... 261/DIG. 54
3,182,977  5/1965  Erni ............................. 261/DIG. 54
3,464,189  9/1969  Mergenthaler........................ 55/256

*Primary Examiner*—Tim R. Miles
*Assistant Examiner*—Steven H. Markowitz
*Attorney*—Michael S. Striker

[57] ABSTRACT

Apparatus for scrubbing of gases wherein the duct through which a gas stream to be treated is conveyed includes a section located below the level of liquid in a tank. The narrowest part of the duct section accommodates at least one transversely extending barrier which produces turbulence in a portion of the interior of the duct located immediately downstream of the barrier, and such portion of the interior of the duct communicates with one or more relatively large openings which admit liquid from the tank into the turbulent gas stream whereby the liquid is atomized and dust or other particles in the gas stream react with or are surrounded by globules of atomized liquid. Such globules are segregated from the thus cleaned gas stream in a cyclone diffuser or other separating device.

14 Claims, 6 Drawing Figures

Patented Aug. 14, 1973

INVENTOR
HELMUT MERGENTHALER

BY
ATTORNEY

Patented Aug. 14, 1973

INVENTOR
HELMUT MERGENTHALER

BY
*[signature]*
ATTORNEY 3,751,883

APPARATUS FOR SCRUBBING OF GASEOUS FLUIDS

BACKGROUND OF THE INVENTION

The present invention relates to apparatus for removing dispersoids from gases, particularly to scrubbers for removal of dust or other solid impurities from air or other gaseous fluids. The invention also relates to improvements in apparatus which can be utilized for contacting the particulate matter in a gaseous stream with finely distributed gaseous or liquid agents.

It is already known to remove solid dispersoids from air or other gaseous fluids in an upright venturi scrubber wherein the gas flows downwardly and is contacted by water or other cleaning liquid during passage through the throat of the venturi. The liquid is admitted in atomized state through suitable spray nozzles, either in or at right angles to the direction of gas flow. A drawback of such scrubbers is that the initial and maintenance cost is very high, mainly because the nozzles are expensive and the liquid (which is normally recirculated through the nozzles) must be subjected to a thorough cleaning action. Moreover, the liquid must be circulated at a very high pressure because only such circulation insures intimate contact between atomized liquid and the entire gas stream.

It is also known to remove dispersoids in a scrubber wherein the gas stream is caused to pass through a body of liquid, i.e., to immerse a portion of the gas-conveying duct in a supply of liquid in a tank or a like receptacle. The immersed portion of the duct tapers in the direction of gas flow to effect acceleration of gas below the liquid level. The liquid is admitted into the immersed portion (by way of a narrow ring-shaped orifice or through a jet pipe) in the region of maximum acceleration of the gas stream. The rapidly flowing gas atomizes the liquid without resorting to pumps or other liquid circulating, atomizing and pressurizing equipment. A drawback of such scrubbers is that the orifice or the jet pipe is likely to become clogged, especially if the liquid is reused without filtering. Furthermore, jet pipes are expensive and their efficiency is limited.

SUMMARY OF THE INVENTION

An object of the invention is to provide a simple gas scrubbing apparatus wherein the liquid-admitting opening or openings are less likely to become clogged than in conventional scrubbers, which is capable of insuring uniform and thorough contact between a gas stream and atomized cleaning liquid even though the liquid need not be subjected to a pressurizing action, and which can be used for removal of dispersoids from various gases.

Another oeject of the invention is to provide an apparatus which can be utilized to react the particulate matter in a gas stream with gaseous or liquid cleaning, neutralizing or like agents.

A further object of the invention is to provide an apparatus for wetting or resorption of particulate matter in a gas stream, particularly for segregation of dust or other solid contaminants from air.

The apparatus of the present invention is utilized for scrubbing, neutralizing, detoxication and/or analogous treatment of gases. It comprises a receptacle for a supply of liquid (e.g., water), a duct defining a passage wherein a stream of gas to be treated is conveyed in a predetermined direction and including a section located below the level of liquid in the receptacle, and a constriction including at least one barrier provided in the duct section and extending substantially transversely of the direction of gas flow to reduce the cross-sectional area of the passage and to produce turbulence in the gas stream in that portion of the passage which is located immediately downstream of the barrier. The duct section is provided with one or more preferably large openings which admit liquid from the receptacle into the aforementioned portion of the passage whereby the thus admitted liquid is atomized and its globules entrap and/or react with the solid particles in the turbulent gas stream.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
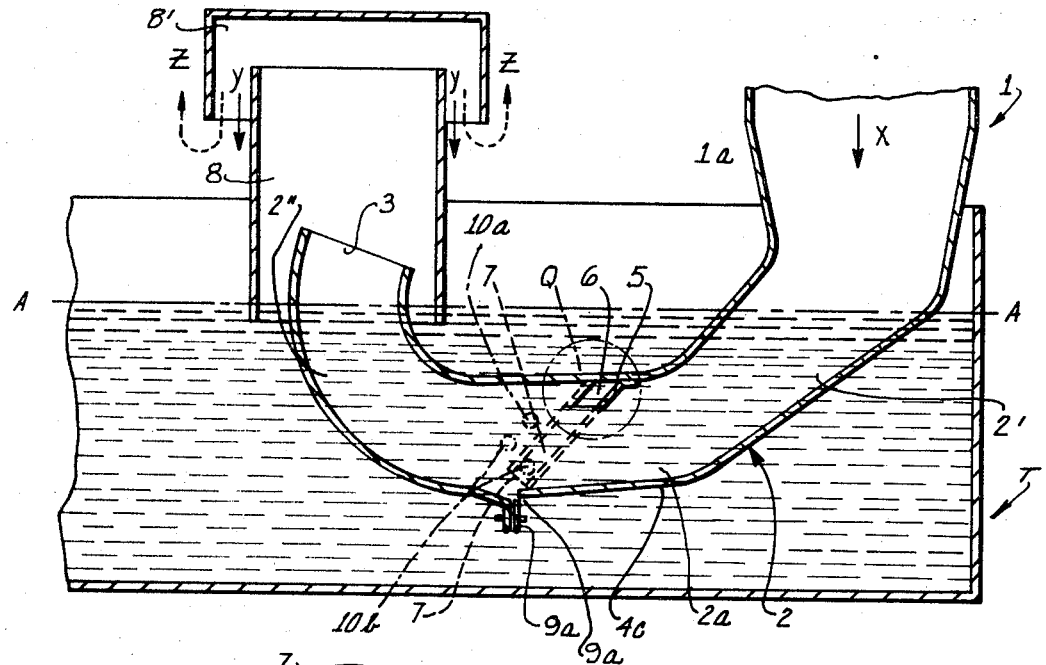
FIG. 1 is a schematic vertical sectional view of a scrubbing apparatus which embodies the invention.

Referring first to FIG. 1, there is shown a scrubbing apparatus which comprises a duct 1 serving to convey a gas stream which is admitted in the direction indicated by arrow X. The section 2 of the duct 1 dips into a supply of liquid (e.g., water) which fills a receptacle or tank T to the level indicated by the line A—A. The first or upstream part 2' of the section 2 tapers in the direction of gas flow and communicates with an intermediate or second part 2a which is parallel to the water level A—A. The downstream portion 2'' of the section 2 is curved upwardly and extends above the water level. The part 2' receives the gas stream from a downwardly tapering inlet portion 1a of the duct 1. It is assumed that the duct 1 is of square cross-sectional outline.

Figure 2:
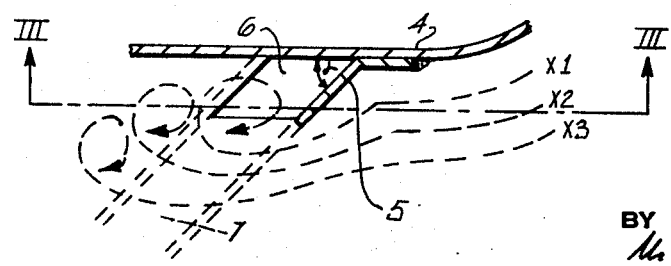
FIG. 2 is an enlarged view of the detail within the phantom-line circle Q shown in FIG. 1.

The top wall 4 of the part 2a is horizontal (i.e., it extends in parallelism with the water level A—A) and its inner side supports a downwardly extending transverse constriction or barrier 5 which is best shown in FIG. 2. This barrier 5 is a profiled metallic bar having two legs one of which is welded or otherwise secured to the inner side of the top wall 4 of the part 2a and the other leg of which extends into the passage of the duct 1 at an acute angle to the direction of gas flow. The angle alpha shown in FIG. 2 is preferably about 45° but it can be smaller or larger than 45°. The barrier 5 extends transversely across the full width of the part 2a and terminates at 5', namely, at the two vertical side walls 4a, 4b of the part 2a. These side walls are provided with two relatively large rhombus-shaped openings 6 which are located immediately downstream of the downwardly inclined leg of the barrier 5 and serve to admit water into the gas stream in the part 2a. If desired, the openings 6 can receive water from the tank T by way of two upwardly extending and rearwardly inclined channels 7 (FIGS. 1 and 3) whose lower ends 7' communicate with the interior of the tank T in the region of the bottom wall 4c of the part 2a. The channels 7 can be welded to the duct 1 and their purpose is to prevent penetration of gas from the duct 1 into the body of water in the tank T.

It is assumed that the gas stream which enters the inlet portion 1a of the duct 1 contains particles of dust and is compelled to flow downwardly as indicated by the arrow X. The portion 1a and the part 2' taper in the direction of gas flow and cause the stream to increase its speed so that it reaches the part 2a while flowing at a relatively high speed. The transversely extending barrier 5 (and more particularly the downwardly extending forwardly inclined leg of this barrier) causes a reduction in the cross-sectional area of the passage in the part 2a and brings about additional acceleration of the gas stream. Furthermore, the barrier 5 produces in the gas stream a very pronounced turbulence as indicated by the arrows X1, X2, X3 shown in FIG. 2. Such turbulence develops in that portion 2A of the passage which is located immediately downstream of the barrier 5 and the turbulent gas stream entrains the inflowing water so that such water undergoes very pronounced atomization and its globules entrap the particles of dust in the flowing gas stream. The turbulence causes a uniform atomization across the full cross-sectional area of the part 2a so that each portion of the gas stream is treated to the same extent. The water which is atomized in the portion 2A is admitted by way of the channels 7 and openings 6. It was found that the atomizing action of the apparatus shown in FIG. 1 is very rapid and very thorough, and that the atomized liquid scrubs all parts of the gas stream with a very high degree of efficiency. The opening 6 are preferably placed immediately downstream of the respective end portions 5' of the barrier 5.

In order to allow for at least some regulation of the rate of liquid admission into the part 2a, the latter's bottom wall 4c is preferably provided with a transversely extending liquid-admitting aperture in the form of a slot 9 whose cross-sectional area may be regulated by a suitable valve, e.g., a simple flap 9a, a slide or the like.

Figure 3:
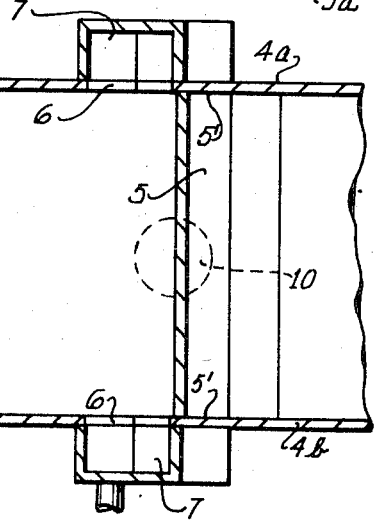
FIG. 3 is a horizontal sectional view as seen in the direction of arrows from the line III—III of FIG. 2.

If it is desired to treat the gas stream with two or more fluid cleaning agents, the apparatus may be further provided with one or more supply conduits which admit one or more additional fluids into the part 2a of the section 2. As shown in FIG. 3 by broken lines, the discharge end of a supply conduit 10 can be connected with the top wall 4 of the part 2a downstream of the downwardly extending leg of the barrier 5 to admit a second liquid or a gaseous fluid into the portion 2A. Additional supply conduits can be connected with the side walls 4a, 4b of the part 2a. FIG. 1 shows the discharge ends of two additional conduits 10a, 10b which communicate with the portion 2A of the gas conveying passage in the duct 1 at a level below the illustrated opening 6 and are located in the rear side wall 4a of the part 2a. The other side wall 4b of the part 2a may also support the discharge end(s) of one or more supply conduits. Furthermore, the supply conduit 10a and/or 10b can communicate with the portion 2A downstream (to the left) of the opening 6 shown in FIG. 1. Still further, the conduit 10 can be omitted if the apparatus includes the conduit 10a and/or 10b. Moreover, and as shown in FIG. 3, at least one of the channels 7 can be connected with a further supply conduit 10c. Thus, the additional treating fluid or fluids can be admitted through the top wall 4 or side walls 4a, 4b (or even the bottom wall 4c) of the part 2a so that such fluid or fluids are subjected to a thorough atomizing action and remove additional particulate material from the gas stream. If the additional fluid is admitted by way of the conduit or conduits 10c, it is mixed with the liquid (water in the tank T) before it reaches the gas stream.

As shown in FIG. 1, the downstream portion 2" of the duct 1 has a very pronounced curvature and its outlet 3 (located above the water level A—A) discharges the cleaned gas stream into a further unit of the scrubbing apparatus, for example, into a diffuser (not shown) which receives the gas stream by way of a bounce bell or a set of breaker plates so that the gas is dried on its way into the diffuser. The diffuser can be replaced with a labyrinth, a cyclone or any other apparatus capable of removing the moisture from the gas stream. Such moisture consists of liquid globules which surround particles of dust.

FIG. 1 merely shows an upright tube 8 whose open lower end dips into the liquid in the tank T and which surrounds with clearance the outlet 3 of the portion 2". A bell 8 overlies the upper end of the tube 8 and causes the globules of liquid to return into the tank T (arrows Y shown by solid lines). The broken-line arrows Z indicate the direction of gas flow. It was found that, in many instances, such a simple tube suffices to insure satisfactory removal of moisture from the cleaned gas stream. The tube 8 may have a cylindrical or polygonal (square or other) cross-sectional outline. The strong curvature of the portion 2" is of advantage because the heavier globules of liquid whose inertia is rather high move across the gas stream which flows upwardly and thereby entrap additional particles of dust before such heavier globules enter the tube 8. Thus, the relatively light dust particles which are deflected by the portion 2" during travel from the part 2a into the tube 8 move across the path of heavier liquid globules and are thus contacted by and surrounded by such globules. This enhances the cleaning action. The cleaning action in the portion 2" is further enhanced by the fact that the speed of relatively light dust particles differs from the speed of heavier globules of liquid cleaning medium.

Figure 4:
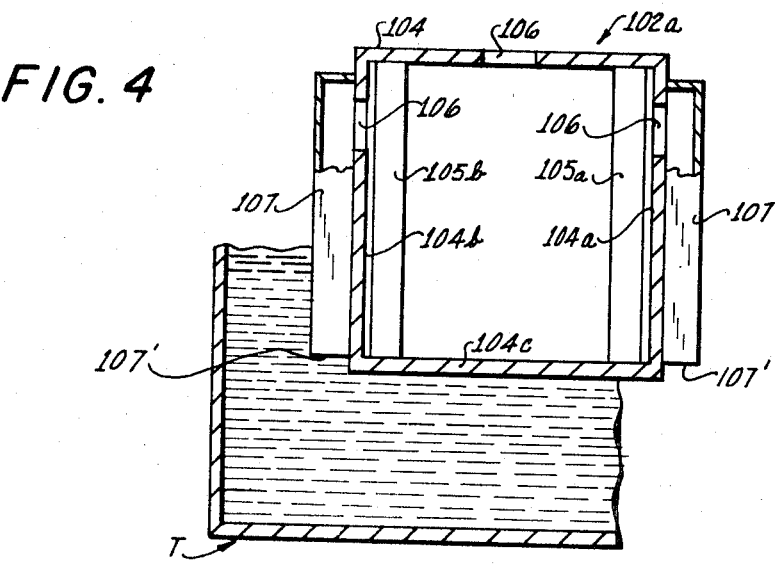
FIG. 4 is a transverse vertical sectional view of the submerged section of the duct in a second apparatus.

FIG. 4 shows the median part 102a of a modified duct. The side walls 104a, 104b of this part 102a carry barriers 105a, 105b which together constitute a composite constriction and are welded to the duct. Their inclined legs extend into the interior of the passage for the gas stream. The openings 106 are provided in the upper portions of side walls 104a, 104b close to the top wall 104 and downstream of the barriers 105a, 105b. It is equally possible to replace the openings 106 with one or more openings in the top wall 104. One such opening is shown at 106a. The channels 107 establish communication between the openings 106 and the interior of the tank T. The inlets 107' of the channels 107 are located at the level of the bottom wall 104c of the part 102a. If the openings 106 (or analogous openings) are provided in the bottom wall 104c, the channels 107 can be dispensed with.

Figure 5:
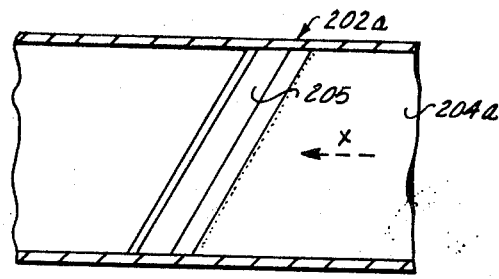
FIG. 5 is a fragmentary longitudinal vertical sectional view of the submerged section of the duct in a third apparatus.

FIG. 5 illustrates a duct part 202a whose side wall 204a is provided with an inclined barrier 205. The longitudinal direction of this barrier makes an angle of about 45° with the direction of gas stream flow through the duct (arrow X). A second barrier can be provided at the inner side of the other side wall (not shown) of the part 202a, preferably directly opposite the illustrated barrier 205. The inclination of the barrier or barriers 205 is preferably similar to that of the channel 7 illustrated in FIG. 1.

Figure 6:
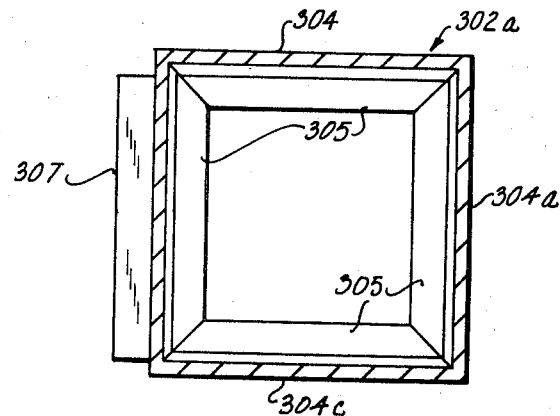
FIG. 6 is a transverse vertical sectional view of a portion of the duct in a fourth apparatus.

As shown in FIG. 6, the median part 302a of the duct may carry four discrete barriers 305, one on each of the walls 304, 304a, 304b, 304c. The openings (not shown) for admission of the liquid cleaning medium can be provided in each of the walls 304–304c or only in one, two or three of these walls. At least those openings which are provided in the walls 304, 304a, 304b preferably receive liquid by way of channels 307 (only one shown) the lower ends of which extend to the general level of the bottom wall 304c. It is further clear that the invention can be embodied in apparatus wherein the gas conveying duct has a circular, oval or polygonal outline which is other than a square or rectangular outline.

Square or rectangular ducts (or at least square or rectangular median parts of ducts) are preferred at this time because they can be connected with straight barriers consisting of commercially available profiled stock. If desired, the duct and/or the constriction including one or more barriers may consist of synthetic plastic or other nonmetallic material. It is also possible to place the free leg of each barrier at right angles to the direction of the flow (in FIG. 2, the lower leg of the barrier 5 could be located in a vertical plane). Such a barrier could be made of profiled L-stock. The rhombus-shaped openings for admission of treating fluid or fluids can be replaced with square, rectangular, circular or oval openings without departing from the spirit of my invention. At this time, I prefer openings which are not in the form of slits or slots because they are less likely to be clogged with impurities. Therefore, a scrubbing apparatus which is formed with openings 6 or analogous openings need not be provided with a filtering system for liquid which is admitted into the median part of the submerged duct section.

The aforementioned supply conduits (such as the conduit 10 in FIG. 3) can admit a liquid or a gaseous fluid. For example, the fluid which is admitted through one or more supply conduits can be of the type which reacts with impurities in the gas stream to facilitate rapid separation of such impurities. Also, the fluid which enters the duct via conduit 10 or another supply conduit may be of the type which neutralizes the gas stream; for example, by reacting with a gas or liquid which enters through the supply conduit, the gas stream in the duct can be rendered non-flammable or non-toxic. The openings for admission of liquid from the tank T and the discharge ends of the supply conduits need not extend along the full height or width of the intermediate part of the submerged duct section because the turbulence in the portion of the gas conveying passage behind the barrier or barriers is strong enough to insure proper atomization of liquid and intimate mixing of the gas stream with one or more treating fluids even if such fluids are admitted through relatively small openings and/or conduits. Openings and conduits of relatively large cross-sectional area are normally preferred because the admission of treating fluids then consumes less energy. Finally, the conduit or conduits (such as 10, 10a, 10b) can be used for admission of the same fluid which is accommodated in the tank T.

Without further analysis, the foregoing will so fully reveal the gist of the present invention that others can, by applying current knowledge, readily adapt it for various applications without omitting features which fairly constitute essential characteristics of the generic and specific aspects of my contribution to the art, and therefore, such adaptations should and are intended to be comprehended within the meaning and range of equivalence of the claims.

What is claimed as new and desired to be protected by Letters Patent is set forth in the appended

1. Apparatus for scrubbing or analogous treatment of gases, comprising a receptacle for a supply of liquid; a duct defining a passage wherein a stream of gas to be treated is conveyed in a predetermined direction, said duct including a section located below the level of liquid in said receptacle; and a constriction including at least one barrier provided in said section and extending substantially transversely thereof to reduce the cross-sectional area of said passage and to produce turbulence in the gas stream in a portion of said passage located downstream of said barrier, at least that part of said section which accommodates said barrier and surrounds said portion of said passage having a polygonal cross-sectional outline, particularly a square or rectangular outline, and said part of said section extending substantially horizontally and including a top wall and two side walls, said barrier being inwardly adjacent to said side walls and said section having two liquid-admitting openings of relatively large cross-section each provided in one of said side walls adjacent to the respective end portion of said barrier, said openings communicating with said portion of said passage adjacent to and downstream of said barrier and being arranged with respect to said receptacle in such a way that a stream of liquid will pass into said portion of said passage through substantially the whole cross section of each opening so that said streams of liquid are atomized to thereby effect a thorough scrubbing of the gas stream.

2. Apparatus for scrubbing or analogous treatment of gases, comprising a receptacle for a supply of liquid; a duct defining a passage wherein a stream of gas to be treated is conveyed in a predetermined direction, said duct including a section located below the level of liquid in said receptacle; and a constriction including two barriers provided in said section and extending substantially transversely thereof to reduce the cross-sectional area of said passage and to produce turbulence in the gas stream in a portion of said passage located downstream of said barriers, said section having at least one liquid-admitting opening of relatively large cross section communicating with said portion of said passage adjacent to and downstream of said barriers, said opening being arranged with respect to said receptacle in such a way that a stream of liquid will pass into said portion of said passage through substantially the whole cross section of said opening so that said stream of liquid is atomized to thereby effect a thorough scrubbing of the gas stream, at least that part of said section which accommodates said barriers and surrounds said portion of said passage having a polygonal cross-sectional outline, particularly a square or rectangular outline, said part of said section extending substantially horizontally and comprising two side walls and additional walls including a top wall and a bottom wall, each of said barriers being inwardly adjacent to one of said side walls and said opening being provided in one of said additional walls.

3. Apparatus for scrubbing or analogous treatment of gases, comprising a receptacle for a supply of liquid; a duct defining a passage wherein a stream of gas to be treated is conveyed in a predetermined direction, said duct including a section located below the level of liquid in said receptacle; and a constriction including at least one barrier provided in said section and extending substantially transversely thereof to reduce the cross-sectional area of said passage and to produce turbulence in the gas stream in a portion of said passage located downstream of said barrier, said section comprising a substantially horizontal median part of minimum cross-sectional area which accommodates said barrier and is provided with at least one liquid-admitting opening communicating with said portion of said passage.

4. Apparatus for scrubbing or analogous treatment of gases, comprising a receptacle for a supply of liquid; a duct defining a passage wherein a stream of gas to be treated is conveyed in a predetermined direction, said duct including a section located below the level of liquid in said receptacle; and a constriction including at least one barrier provided in said section and extending substantially transversely thereof to reduce the cross-sectional area of said passage and to produce turbulence in the gas stream in a portion of said passage located downstream of said barrier, said section having at least one liquid-admitting opening of relatively large cross-section communicating adjacent and downstream of said barrier with said portion of said passage, said liquid-admitting opening being arranged with respect to said receptacle in such a manner that liquid will pass in a stream through substantially the whole cross-section of said opening into said portion of said passage in which turbulence in said gas stream is produced so that said stream of liquid is atomized to thereby produce a thorough scrubbing of the gas stream.

5. Apparatus as defined in claim 4, wherein at least that part of said section which accommodates said barrier and surrounds said portion of said passage has a polygonal cross-sectional outline, particularly a square or rectangular outline.

6. Apparatus as defined in claim 5, wherein said part of said section comprises four walls and wherein said constriction comprises four barriers each inwardly adjacent to one of said walls.

7. Apparatus as defined in claim 5, wherein said part of said section includes a pair of side walls and wherein said constriction comprises two elongated barriers each inwardly adjacent to one of said side walls, each of said barriers making an oblique angle with said predetermined direction.

8. Apparatus as defined in claim 4, wherein said duct includes an upwardly curved portion which conveys the gas stream from said portion of said passage above the liquid level in said receptacle.

9. Apparatus as defined in claim 8, further comprising means for separating liquid globules from the gas stream downstream of said upwardly curved portion.

10. Apparatus as defined in claim 4, wherein said section includes a first part and a second part located downstream of said first part, said first part tapering toward said second part and said second part accommodating said barrier.

11. Apparatus as defined in claim 10, wherein the cross-sectional area of said second part is less than the cross-sectional area of the remainder of said section and wherein said opening is provided in said second part.

12. Apparatus as defined in claim 4, further comprising channel means for admitting liquid to said opening, said channel means having inlet means located below said opening at such depth in the liquid in said receptacle that the gas stream cannot penetrate into said receptacle.

13. Apparatus as defined in claim 4, further comprising at least one fluid-supplying conduit connected with said section of said duct to discharge a fluid into said portion of said passage.

14. Apparatus as defined in claim 4, wherein said opening is of polygonal outline.

* * * * *